United States Patent [19]
Evans

[11] 3,792,863
[45] Feb. 19, 1974

[54] SWING MEASUREMENT SYSTEM AND METHOD EMPLOYING SIMULTANEOUS MULTI-SWING DISPLAY
[75] Inventor: James W. Evans, Jacksonville, Fla.
[73] Assignee: Athletic Swing Measurement Inc., Clearwater, Fla.
[22] Filed: May 30, 1972
[21] Appl. No.: 258,018

[52] U.S. Cl. ............. 273/186 A, 340/279, 340/262, 340/282, 340/366 CA, 340/177 R, 273/DIG. 28
[51] Int. Cl............................................ A63b 69/36
[58] Field of Search .. 273/186, 26, 29, 73, DIG. 28, 273/183 B; 35/29 A

[56] References Cited
UNITED STATES PATENTS
3,717,857  2/1973  Evans ......................... 273/183 B X
3,270,564  9/1966  Evans ......................... 273/186 A X Primary Examiner—George J. Marlo
Attorney, Agent, or Firm—Duckworth, Hobby & Allen

[57] ABSTRACT

A system and method for measuring at least one element of motion of the swing of an athletic implement, in which electrical signals from torque, strain and flex gauges in the implement representative of successive swings are sequentially stored and then at least two signals of successive swings of one of torque, strain or flex are simultaneously displayed, as magnitude versus time, for comparison.

14 Claims, 2 Drawing Figures

SWING MEASUREMENT SYSTEM AND METHOD EMPLOYING SIMULTANEOUS MULTI-SWING DISPLAY

BACKGROUND OF THE INVENTION

This invention relates to measurement systems, and in particular, to systems designed to measure and display the characteristics of the swing of an athletic implement.

In U.S. Pat. No. 3,270,564, I disclose a system for measuring three elements of motion (velocity, torque, and flex) for the swing of an athletic implement, such as a golf club. In this system, any one or all of these three elements are sensed during the swing and converted to an electrical signal. This signal is transmitted to a nearby console, where it is processed and visually displayed in real-time on an oscillograph or oscilloscope. In conjunction with this real-time display, the signals representative of a number of swings can be averaged, which average is then compared with a reference swing.

In U.S. Pat. application Ser. No. 93,200, filed Nov. 27, 1970, now U.S. Pat. No. 3,717,857, I disclose a swing measurement system which is worn on the athlete's arm.

SUMMARY OF THE INVENTION

The present invention comprises a system and method for measuring at least one element of motion of a member. Motion sensing means which is reponsive to successive movements of said member provides a sequence of electrical signals, each of whch is a function of at least one element of motion of a corresponding movement. Signal processing means responsive to the sequential outputs of the sensing means provides simultaneous inputs to a visual display means. The visual display means, in turn, simultaneously displays the inputs as representative of the corresponding movements.

THE DRAWING

DETAILED DESCRIPTION

An embodiment of the invention is described below with reference to FIG. 1. In this embodiment, three elements of the motion of the swing of a golf club are measured, signals representative of the elements for successive swings are sequentially stored, and then the signals for all of the swings are simultaneously displayed for comparison. It will be understood, however, that the invention is not limited to this embodiment, and may be employed in a variety of other applications.

Figure 1:
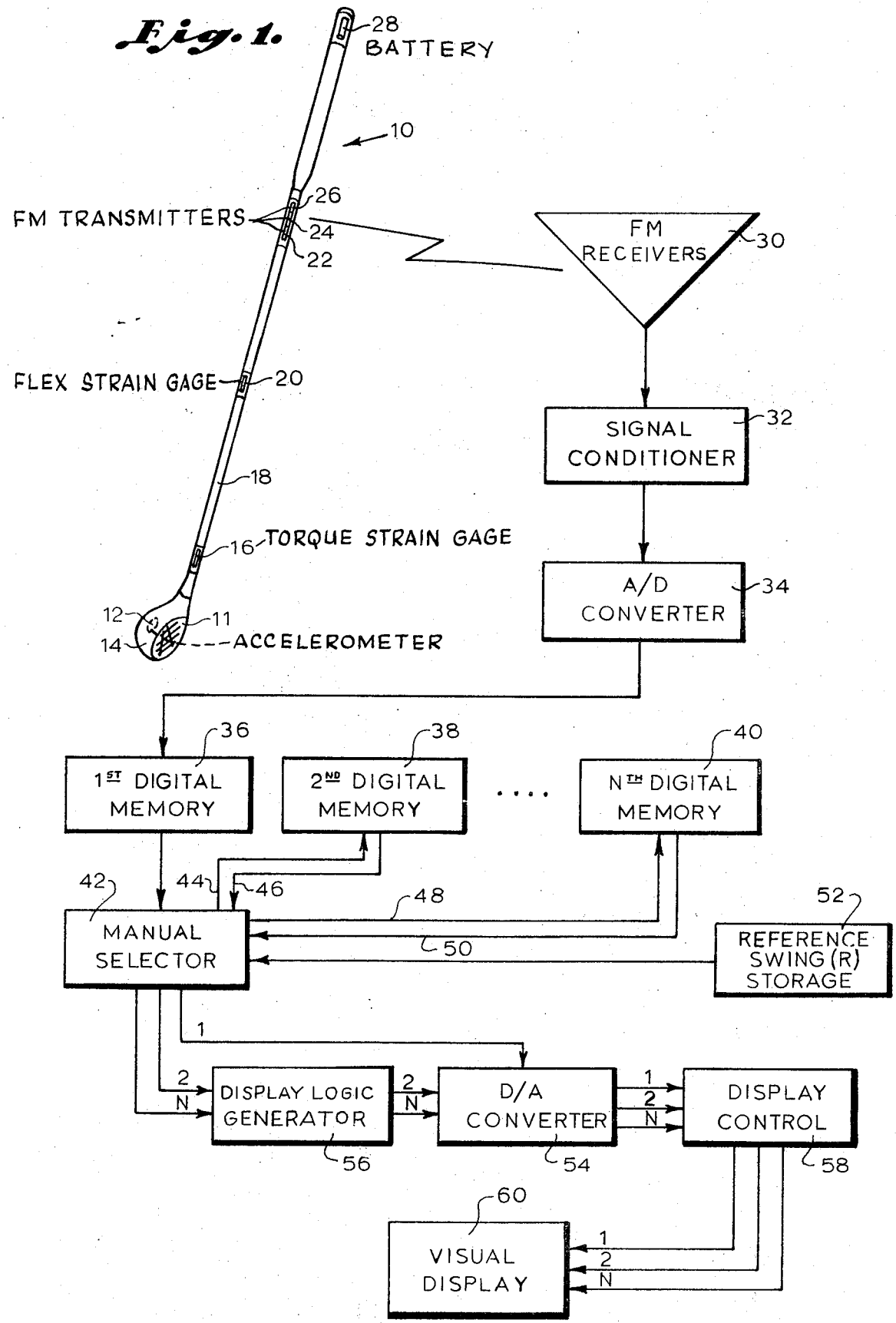
FIG. 1 illustrates, partly in block diagram form, a golf club swing measurement system which embodies the present invention.

The embodiment of FIG. 1 includes a golf club 10 having a club head 14 and a shaft 18. The club head 14 includes a club face 11 which is adapted to strike a golf ball. An accelerometer 12 is located in the club head 14 and is adapted to measure the velocity of the club head 14 during the swing. A torque strain gage 16 is positioned within the shaft 18 proximal to the club head 14 and is adapted to measure the torque, or angular momentum, about the axis of the shaft 18 during the swing. A flex strain gage 20 is positioned in an intermediate region of the shaft 18 and is adapted to measure the flex, or bending, of the shaft 18 during the swing. Each of the motion sensors (the accelerometer 12, the torque 16, and the flex gage 20) are capable of providing an analog electrical output which indicates the magnitude of the corresponding element of motion (velocity, torque, and flexure, respectively) with respect to time.

The golf club 10 further comprises means for transmitting the respective outputs of the sensors 12, 16 and 20 to a nearby console for further processing and display as described below in greater detail. The transmission means may comprise, as shown in FIG. 1, three F.M. transmitters 22, 24 and 26 which transmit (either on three different frequencies or on a single multiplexed frequency) a signal modulated by the output of the sensors 12, 16 and 20, respectively. The shaft 18 may serve as a transmitting antenna for the transmitters 22, 24 and 26. The sensors 12, 16 and 20 and the transmitters 22, 24 and 26 are powered by a voltage source 28, such as a D.C. battery, which is located in the upper portion of the shaft 18. The golf club 10, as described thus far, is essentially identical to the instrumented golf club described in the U.S. Pat. No. 3,270,564.

In an alternate arrangement of the system of FIG. 1, a carrier frequency is transmitted from the nearby console to a passive repeater circuit in the club 10. The carrier is modulated by the outputs of the sensors 12, 16 and 20 and transmitted to the console for processing and display. This system is disclosed in my U.S. application Ser. No. 205,067, filed Dec. 6, 1971.

The system of FIG. 1 further includes an FM receiver 30 for receiving and demodulating the transmitted signals which are representative of the velocity, torque and flex of each swing of the club 10. The receiver 30 and other signal processing and display circuits and components described below may be housed in a record/playback console such as that disclosed in the aforementioned patent.

The output of the receiver 30 is fed to a signal conditioning circuit 32 which includes means for amplifying the signal and discarding noise. The output of the signal conditioner 32 is fed to an analog-to-digital (A/D) converter 34, where the analog outputs of the sensors 12, 16 and 20 are translated into a digital format.

The system of FIG. 1 also comprises a plurality of digital memory circuits, including a first digital memory 36, a second digital memory 38, and an $N^{th}$ digital memory 40. It will be understood that the $N^{th}$ digital memory 40 represents the last one of any finite number of digital memory circuits. The first digital memory 36 is adapted to receive and serially store the digital output of the analog-to-digital converter 34 which is representative of the three elements of motion of each successive swing of the golf club 10.

The stored digital signals for each successive swing are, on call, fed out of the first memory 36 to a selector circuit 42. Input and output circuit means 44 and 46, respectively, are provided between the selector circuit 42 and the second memory 38. Like input and output circuit means are provided between the selector circuit 42 and each additional memory, such as the input and output circuit means 48 and 50, respectively, between the $N^{th}$ digital memory 40 and the selector circuit 42. The selector circuit 42 may comprise a manually operated switching circuit capable of feeding the output of the first memory 36 for storage in the second through the N$^{th}$ memories N$^{th}$ 38, 40 via the respective input means 44 or 48, and then subsequently selecting and playing back the stored signals through the respective output means 46 or 50. Alternatively, the selector circuit 42 may comprise an automatic switching arrangement which is designed to perform this record-playback function into and out of the second through the N$^{th}$ memories 38, 40. In this way, the signals representative of each successive swing can be serially stored and simultaneously played back through the selector circuit 42.

Although it is not essential, the system may include reference swing storage means 52 which can provide, on call, an input to the selector 42 which is representative of an ideal swing of the golf club 10. For example, the reference swing storage means 52 may comprise a recorded tape cassette which can be plugged into the system by the operator of the manual selector circuit 42 nd fed into one of the auxiliary memories 38, 40.

The manual selector circuit 42 has a plurality of output meand 1, 2, . . . .N including one output (identified by "1" in FIG. 1) which feeds the output of the first digital memory 36 to a digital-to-analog (D/A) converter 54. Other ones of the outputs from the selector 42 feed the outputs, when played back, of the second through the N$^{th}$ memories 38, 40 into a display logic generator 56. Two of these output means are identified as "2" and "N" in FIG. 1, and are associated with the respective second and N$^{th}$ memories 38 and 40.

The display logic generator 56 generates for each output 2, . . . .N of the selector 42, a logic which distinguishes that output from all of the other outputs of the selector. For example, output 1 may comprise signals which will be presented as solid lines on a visual display 60. which is described below in greater detail. The logic generator 56 may then generate digital signals for output 2 which is presented as dotted lines on the display, dashed lines for output N of the selector 42, and so on. In this way, each input to the visual display is visually distinguishable from the other inputs. The digital outputs 2, . . . .N of the logic generator 56 are then fed to the digital-to-analog converter 54.

The analog outputs 1, 2, . . . .N of the digital-to-analog converter 54 are fed to display control means 58, which may comprise, for example, the horizontal and vertical deflection circuits of an oscillograph or an oscilloscope. The display control means 58, in turn, drives a visual display 60, such as the oscillograph and oscilloscope associated with the deflection circuitry just described.

The operation of the system of FIG. 1 will now be described. After the golfer has completed one swing of the club 10, the output of the three motion sensors 12, 16 and 20 for that swing are processed and stored in the first memory 36. The operator of the manual selector 42 then calls up the signals representative of the one swing, which are displayed on the visual display 60. At the same time, the operator manually selects the second digital memory 38, in order that the output representative of the one swing is stored in the second memory through selector 42.

Subsequently, the golfer completes another swing, the signals representative of which are stored in the first memory 36. The operator of the manual selector 42 may then call up and store the signals of this swing into a third memory, the signals of a third swing in a fourth memory, and so on through the N$^{th}$ memory 40, until signals representative of successive swings are stored in all of the memories. The last of the successive swings is stored in the first memory 36. In this way signals representative of N successive swings may be sequentially stored and then simultaneously displayed.

Figure 2:
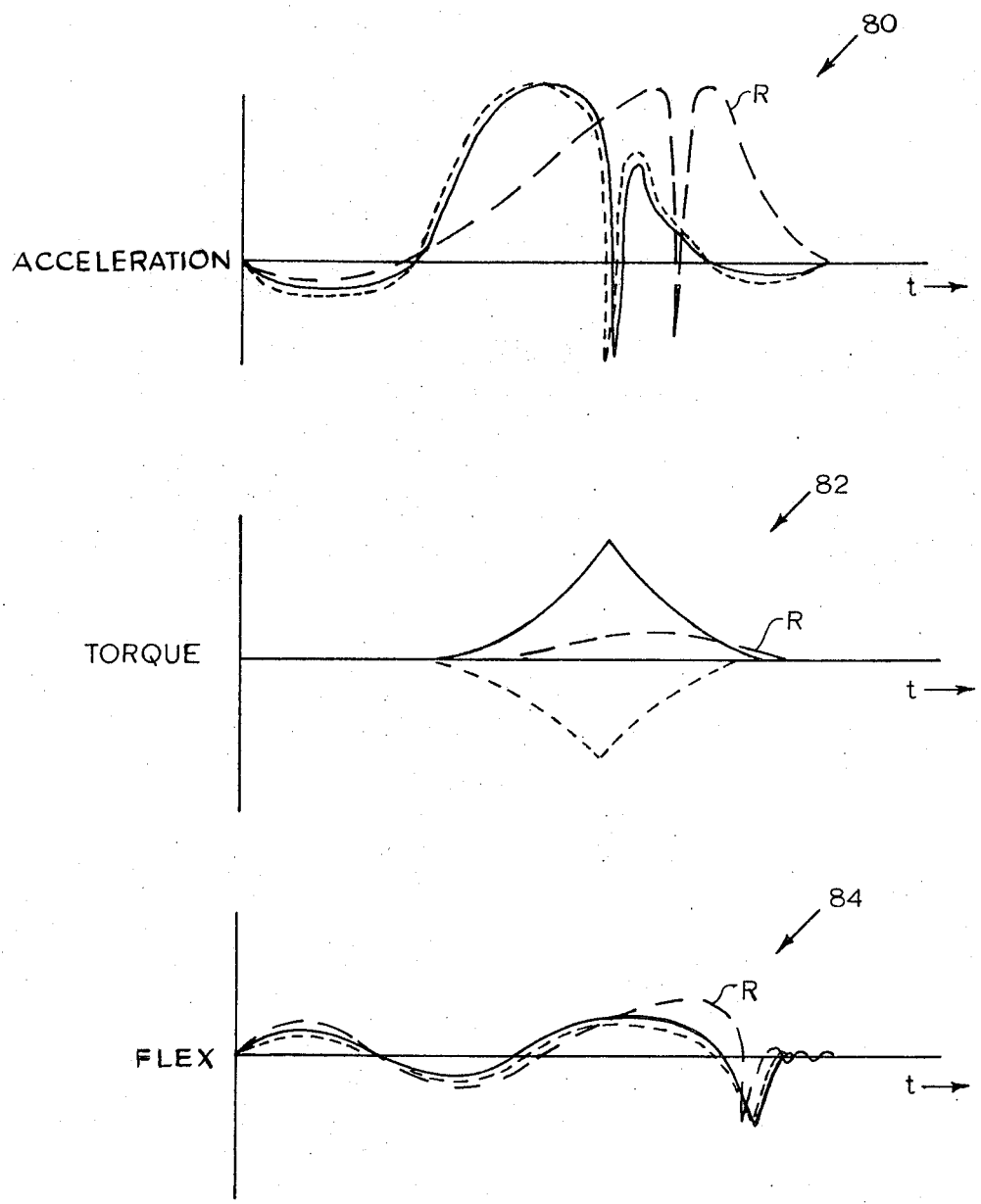
FIG. 2 depicts a visual display which may be obtained from the system of FIG. 1.

FIG. 2 illustrates three sets of simultaneous oscilloscope traces that can be obtained in this way. For purposes of FIG. 2, it is assumed that the golfer has completed the two swings described above. The signals representative of the first swing are stored in the second memory 38 and the signals of the second swing remain stored in the first memory 36. Additionally, the operator of the manual selector 42 has called up the reference swing signals and stored those reference swing signals in the N$^{th}$ memory 40. After completion of the second swing and storage of the reference swing signal, the operator then calls up the stored signals in the first through the N$^{th}$ memories 36, 38 and 40.

Referring now to FIG. 2, the upper trace set 80 is of plot of the output of the accelerometer 12 versus time for the two swings and the reference swing R, identified by a dashed line. The first swing is identified by a dotted line, and the second swing is identified by a solid line. As seen by the reference trace R, an ideal velocity curve shows an initial reverse velocity during the back stroke, followed by a continued increase in velocity until impact by the club head 11 with the golf ball. Impact is indicated on reference velocity curve R by the sudden drop, and sligt reversal in velocity. In the first and second swings, thee golfer has exhibited a common fault wherein impact does not occur until after a significant decrease in velocity. This consistent error of the golfer is much more apparent because of the simultaneous display of a number of successive swings.

The middle trace set 82 of FIG. 2 is a plot of the output of the torque gage 16 versus time for the two swings and the reference swing R. As shown by the dashed reference torque trace R, very little torque should occur. However, during the first swing (dotted line), the golfer struck the golf ball on the heel of the club head as indicated by the excessive negative torque compartment. During the second swing (solid line), the golfer struck the golf ball at the toe of the club head 14, as indicated by the excessive positive torque component. Such inconsistencies are readily apparent from the simultaneous display of several swings.

The lower trace set 84 of FIG. 2 is a plot of the output of the flex gage versus time for the two swings and the reference swing. Ideally, there is initial forward bending during the back stroke, then a negative bending (opposite to direction of swing), then there should be a positive bend, that is a bend toward the ball during the stroke up until impact with the ball, as illustrated by the dashed reference swing trace R. However, it has been found that frequently, the solid and dotted traces occur, indicating a negative bending prior to impact. While in part this may be due to a loss in velocity prior to impact, this may be determined by examination of velocity trace set 80 for the same individual. If there is no loss in velocity, a negative curve prior to impact, as shown by the solid and dotted traces, would indicate that a handle has been chosen which is insufficiently stiff. Alternatively, a greater club head to overall club weight should be chosen to obtain a greater momentum on the part of the club head 14. Again, these errors are much more apparent to the golfer or an instructor by virtue of the simultaneous display of the signals representative of a number of successive swings.

Other modifications may be employed in the system of FIG. 1. For example, the visual display 60 may comprise a color oscilliscope, in which the successive swings are each designated by different colors. Further, the storage means can comprise an analog memory arrangement such as that described in the U.S. Pat. No. 3,270,564.

I claim:

1. A measurement system comprising:
   an athletic implement;
   motion sensing means responsive to successive movements of saie implement for providing a sequence of electrical signals, each of which is a function of at least one element of motion of a corresponding movement;
   means responsive to a plurality of input signals for providing a simultaneous visual display representative of said input signals; and
   signal processing means responsive to sequential outputs of said motion sensing means for simultaneously providing said input signals to said display means.

2. A measurement system as recited in claim 1, wherein said motion sensing means comprises a sensor responsive to one of velocity, torque, and flex during movement of said implement.

3. A measurement system as recited in claim 2, wherein said signal processing means comprises means for sequentially storing said motion element signals.

4. A measurement system as recited in claim 3, wherein said sequential storing means comprises at least two memory means, one of said memory means being adapted to receive an output from another one of said memory means.

5. A measurement system as recited in claim 4, further comprising means for selecting an output from said another memory means for storing in said one memory means.

6. A measurement system as recited in claim 5, wherein said selecting means further comprises means for playing back said output stored in said memory means simultaneously with another output of said another memory means.

7. A measurement system as recited in claim 6, further comprising means responsive to the simultaneous outputs of said selecting means for providing inputs to said visual display means each of which is visually distinguishable from all other inputs.

8. An athletic swing measurement system, comprising:
   an athletic implement adapted for swinging to strike an object;
   motion sensing means responsive to successive swings of said implement for providing a sequence of electrical signals which are representative of at least one element of motion of successive swings;
   signal processing means responsive to said sequence of signals for providing outputs each of which represents said element of motion for each successive swing;
   first and second memory means, said first memory means responsive to said processing means for serially storing each successive one of said outputs;
   selector means for feeding one output of said first memory means into said second memory means, said selector means further comprising means for playing back said one output out of said second memory means simultaneously with another output of said first memory means; and
   visual display means responsive to said one and another outputs from said selector means for providing a simultaneous visual display representing said outputs.

9. An athletic swing measurement system as recited in claim 8, further comprising:
   an additional number of said memory means; and wherein
   said selector means comprises means for feeding and playing back another, and subsequent outputs of said first memory means serially into and out of said additional memory means.

10. An athletic swing measurement system as recited in claim 9, further comprising means for providing a reference swing input to said selector means.

11. An athletic swing measurement system as recited in claim 9, further comprising logic generating means electrically interposed between said selector means and said visual display means, said logic generating means responsive to outputs of said second and additional memory means for providing inputs to said visual display each of which is visually distinguishable from other inputs thereto.

12. A gold club swing measurement system, comprising:
   a golf club having a shaft with a club head attached thereto;
   motion sensing means carried by said golf club and responsive to a plurality of successive swings of said club for providing an electric signal which is a function of at least one element of motion of each swing;
   means supported by said shaft for transmitting an output modulated by each said signal;
   means for receiving and demodulating said output of said transmitting means and reproducing each said signal;
   means responsive to an output of said receiving means for converting each said signal to a series of digital values;
   first and second memory means, said first memory means providing means for serially storing the digital values representative of each successive swing;
   selection means responsive to an output of said first memory means for recording and playing back the digital values representative of one swing into and out of said second memory means; and
   means responsive to outputs of said selection means for simultaneously providing visual displays representative of said element of said one swing and a like element of another, successive swing.

13. A system as recited in claim 12, further comprising logic generating means responsive to the output of said selection means representative of said one swing for generating a logic which distinguishes said visual display of said one swing from that of said another swing.

14. A method for measuring and displaying an element of motion of one swing of an athletic implement and a like element of a subsequent swing, comprising the steps of:
   sensing said motion element for said one swing;

storing an electrical signal representative of said motion element for said one swing;
sensing said motion element for said subsequent swing;
storing an electrical signal representative of said motion element for said subsequent swing;
simultaneously playing back said signals from storage;
rendering one of said signals distinguishable from the other signal; and
simultaneously providing a visual display representative of said signals.

* * * * *